United States Patent
Zhang et al.

(10) Patent No.: US 12,255,332 B2
(45) Date of Patent: Mar. 18, 2025

(54) SECONDARY BATTERY, BATTERY MODULE, BATTERY PACK AND ELECTRIC DEVICE

(71) Applicant: CONTEMPORARY AMPEREX TECHNOLOGY (HONG KONG) LIMITED, Hong Kong (CN)

(72) Inventors: Cuiping Zhang, Fujian (CN); Changlong Han, Fujian (CN); Peng Fan, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/527,410

(22) Filed: Dec. 4, 2023

(65) Prior Publication Data
US 2024/0105942 A1 Mar. 28, 2024

Related U.S. Application Data

(63) Continuation of application No. PCT/CN2022/096609, filed on Jun. 1, 2022.

(51) Int. Cl.
*H01M 10/0568* (2010.01)
*H01M 4/583* (2010.01)
(Continued)

(52) U.S. Cl.
CPC ....... *H01M 4/583* (2013.01); *H01M 10/0568* (2013.01); *H01M 50/209* (2021.01);
(Continued)

(58) Field of Classification Search
CPC ............... H01M 4/583; H01M 50/209; H01M 10/052; H01M 10/0568; H01M 2004/021; H01M 2004/027; H01M 2220/20
See application file for complete search history.

(56) References Cited

U.S. PATENT DOCUMENTS

2015/0364753 A1 12/2015 Chiang et al.
2016/0218340 A1* 7/2016 Ryu .................. H01M 10/0525
(Continued)

FOREIGN PATENT DOCUMENTS

CN 110333461 A 10/2019
CN 110537093 A 12/2019
(Continued)

OTHER PUBLICATIONS

International Search Report and Written Opinion mailed on Dec. 26, 2022 received for PCT Application PCT/CN2022/096609, filed on Jun. 1, 2022, 19 pages including English Translation.
(Continued)

*Primary Examiner* — Osei K Amponsah
(74) *Attorney, Agent, or Firm* — XSENSUS LLP

(57) ABSTRACT

Provided are a secondary battery, a battery module, a battery pack and an electric device. The secondary battery includes an electrode assembly and an electrolytic solution configured to infiltrate the electrode assembly, wherein the electrode assembly includes a negative electrode plate, a separation film and a positive electrode plate, and the negative electrode plate includes a negative electrode current collector and a negative electrode material layer located on at least one surface of the negative electrode current collector; and by setting a tortuosity of the negative electrode plate as $\tau$, the $\tau$ satisfies Formula I below:

$$\tau=0.5(\varepsilon)^{-\alpha} \qquad \text{Formula I}$$

where, $\varepsilon$ is a porosity of the negative electrode material layer, and $\alpha$ is a Bruggeman index of the negative electrode material layer, and
the $\tau$ and a conductivity $\sigma$ of the electrolytic solution satisfy Formula II below:

$$(2\tau)^{0.5}+6 \leq \sigma \leq (2\tau)^{0.5}+10 \qquad \text{Formula II.}$$

(Continued)

Therefore, the secondary battery has an excellent fast-charging performance.

10 Claims, 4 Drawing Sheets

(51) Int. Cl.
*H01M 50/209* (2021.01)
*H01M 4/02* (2006.01)
*H01M 10/052* (2010.01)

(52) U.S. Cl.
CPC ............... *H01M 2004/021* (2013.01); *H01M 2004/027* (2013.01); *H01M 10/052* (2013.01); *H01M 2220/20* (2013.01)

(56) References Cited

U.S. PATENT DOCUMENTS

2020/0313154 A1  10/2020  Robinson et al.
2022/0231272 A1*  7/2022  Jeon ..................... H01M 4/133

FOREIGN PATENT DOCUMENTS

| | | |
|---|---|---|
| CN | 113424348 A | 9/2021 |
| CN | 113656931 A | 11/2021 |
| CN | 113745450 A | 12/2021 |
| JP | 2009-199730 A | 9/2009 |
| KR | 10-2019-0053014 A | 5/2019 |
| KR | 10-2209675 B1 | 1/2021 |
| KR | 10-2022-0061585 A | 5/2022 |

OTHER PUBLICATIONS

Landesfeind et al., "Tortuosity Determination of Battery Electrodes and Separators by Impedance Spectroscopy", Journal of The Electrochemical Society, vol. 163, No. 7, 2016, pp. A1373-A1387.
Thorat et al., "Quantifying tortuosity in porous Li-ion battery materials", Journal of Power Sources, vol. 188, 2009, pp. 592-600.
Office Action issued Jul. 8, 2024 in Korean Patent Application No. 10-2024-7006078 with English translation.
Office Action issued Jul. 9, 2024 in Japanese Patent Application No. 2024-506187 with English translation.

* cited by examiner

SECONDARY BATTERY, BATTERY MODULE, BATTERY PACK AND ELECTRIC DEVICE

CROSS-REFERENCE TO RELATED APPLICATION

The present application is a continuation of International Application No. PCT/CN2022/096609, filed Jun. 1, 2022, which is incorporated herein by reference in its entirety.

TECHNICAL FIELD

The present application relates to the field of batteries, in particular to a secondary battery, a battery module, a battery pack and an electric device.

BACKGROUND

Secondary batteries have the advantages of reliable serviceability, no pollution and no memory effect, and thus are extensively applied. For example, with the increasing attention to environmental protection issues and the increasing popularity of new energy automobiles, the demand for power secondary batteries will grow tremendously. However, the more and more extensive application of secondary batteries offers a serious challenge to the performance of the secondary batteries.

With the fast pace of life, people must take into account the fast-charging performance in addition to the strong demand for the cycle life of the secondary batteries.

SUMMARY

Regarding the foregoing issue, the present application aims to provide a secondary battery, a battery module, a battery pack and an electric device. The secondary battery has an excellent fast-charging performance.

In order to achieve the above-mentioned objective, a first aspect of the present application provides a secondary battery, wherein the secondary battery includes an electrode assembly and an electrolytic solution configured to infiltrate the electrode assembly; the electrode assembly includes a negative electrode plate, a separation film and a positive electrode plate, and the negative electrode plate includes a negative electrode current collector and a negative electrode material layer located on at least one surface of the negative electrode current collector; and by setting a tortuosity of the negative electrode plate as $\tau$, the $\tau$ satisfies Formula I below:

$$\tau = 0.5(\varepsilon)^{-\alpha} \quad \text{Formula I}$$

where, $\varepsilon$ is a porosity of the negative electrode material layer, and $\alpha$ is a Bruggeman index of the negative electrode material layer, and the $\tau$ and a conductivity $\sigma$ of the electrolytic solution satisfy Formula II below:

$$(2\tau)^{0.5} + 6 \leq \sigma \leq (2\tau)^{0.5} + 10 \quad \text{Formula II.}$$

By virtue of enabling the tortuosity $\tau$ of the negative electrode plate and the conductivity $\sigma$ of the electrolytic solution to satisfy the above relationship, the secondary battery can obtain an excellent fast-charging characteristic and restrain the lithium precipitation on a negative electrode.

In some implementations, the $\tau$ satisfies: $2.3 \leq \tau \leq 7$. Making the tortuosity $\tau$ in the foregoing range improves the dynamic performance of the negative electrode material, and further improves the fast-charging characteristic of the secondary battery.

In some implementations, the $\sigma$ ranges from 8 mS/cm to 14 mS/cm. Making the conductivity $\sigma$ of the electrolytic solution in the foregoing range improves the dynamic performance of the electrolytic solution, and further improves the fast-charging characteristic of the secondary battery.

In some implementations, the porosity $\varepsilon$ of the negative electrode material layer is 25% to 45%. Making the porosity of the negative electrode material layer in this range can improve the dynamic performance of the negative electrode material, and further improves the fast-charging characteristic of the secondary battery.

In some implementations, a negative electrode material is graphite, and the $\alpha$ is 1.5 to 2.2. Therefore, the tortuosity of the negative electrode plate can be estimated more accurately.

In some implementations, the electrolytic solution includes at least one of cyclic ester, dimethyl carbonate, diethyl carbonate, ethyl methyl carbonate, ethyl acetate, methyl acetate, methyl formate, ethyl formate, methyl propionate, propyl formate, ethyl propionate and propyl acetate, and the cyclic ester includes at least one of ethylene carbonate and propylene carbonate. Therefore, the conductivity of the electrolytic solution can be adjusted easily.

In some implementations, a lithium salt of the electrolytic solution includes at least one of lithium hexafluorophosphate ($LiPF_6$) and lithium fluorosulfonyl imide, and has a concentration of 0.5 to 1.5 mol/L. Therefore, the conductivity of the electrolytic solution can be further improved and the lithium precipitation on the negative electrode can be restrained.

In some implementations, the lithium fluorosulfonyl imide includes lithium bis(fluorosulfonyl)imide, lithium fluoro(trifluoromethyl)sulfonylimide, lithium bis(trifluoromethyl)sulfonylimide, lithium bis(pentafluoroethyl)sulfonylimide and lithium fluoro(perfluorobutyl)sulfonylimide, preferably the lithium bis(fluorosulfonyl)imide. Therefore, the conductivity of the electrolytic solution can be further improved and the lithium precipitation on the negative electrode can be restrained.

In some implementations, a thickness of the negative electrode material layer is 30 μm-400 μm in the negative electrode plate. Therefore, a coating amount of a negative electrode active material can be improved, and an energy density of the secondary battery can be further improved.

A second aspect of the present application provides a battery module, and the battery module includes the secondary battery according to the first aspect of the present application.

A third aspect of the present application provides a battery pack, and the battery pack includes the battery module according to the second aspect of the present application.

A fourth aspect of the present application provides an electric device, the electric device includes at least one of the secondary battery according to the first aspect of the present application, the battery module according to the second aspect of the present application and the battery pack according to the third aspect of the present application.

According to the present application, the fast-charging performance of the secondary battery can be improved and the lithium precipitation on the negative electrode can be restrained.

DESCRIPTION OF REFERENCE NUMERALS

Figure 1:
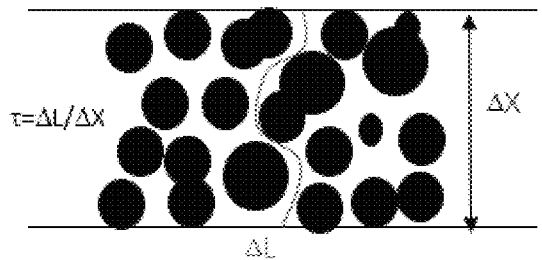
FIG. 1 is a schematic diagram showing a tortuosity $\tau$ of an electrode plate.

1 Battery pack; 2 Upper box body; 3 Lower box body; 4 Battery module; 5 Secondary battery; 51 Housing; 52 Electrode assembly; 53 Top cover assembly

DETAILED DESCRIPTION OF EMBODIMENTS

With reference to the detailed description of drawings properly, the present application particularly discloses implementations of a positive electrode active material and a manufacturing method thereof, a positive electrode plate, a secondary battery, a battery module, a battery pack and an electric device. Nevertheless, some unnecessary detailed descriptions will be omitted. For example, the detailed description of well-known matters and the repetitive specification of the actual same structure are omitted. This is to avoid unnecessary tedious description below and enable those skilled in the art to appreciate. In addition, the accompanying drawings and the following description are provided to allow those skilled in the art to fully appreciate the present application, and are not intended to limit the subject matter recited in the claims.

The "scope" disclosed by the present application is limited by a lower limit and an upper limit, the given scope is limited by selecting the lower limit and the upper limit, both of which define a boundary of a special scope. The scope defined in this way may include or exclude an end value, and may be combined arbitrarily, i.e. any lower limit and any upper limit can be combined into a scope. For example, the scopes appreciated to be 60~110 and 80~120 are expected under the condition of listing the scopes of 60-120 and 80-110 for the specific parameters. In addition, the scopes of 1~3, 1~4, 1~5, 2~3, 2~4 and 2~5 of the lower limit may be fully expected under the condition of listing minimum scope values of 1 and 2 and maximum scope values of 3, 4 and 5. In the present application, unless otherwise stated, the numerical range of "a~b" shows an abbreviated combination of any real numbers of a to b, wherein a and b are real numbers. For example, the numerical range of "0~5" shows that all real numbers between "0 and 5" are listed herein, and "0~5" only shows an abbreviated combination of these numerical values. In addition, when a certain parameter is expressed as an integer ≥2, it is equivalent to disclosing that the parameter is, for example, an integer 2, 3, 4, 5, 6, 7, 8, 9, 10, 11, 12, etc.

When not otherwise specified, all implementations and optional implementations of the present application may be mutually combined into a new technical solution.

When not otherwise specified, all technical features and optional technical features of the present application may be mutually combined into a new technical solution.

When not otherwise specified, "comprising" and "including" mentioned herein may be open-ended or close-ended. For example, the "comprising" and "including" may indicate further comprising or including other components not listed, or only comprising or including the listed components.

When not otherwise specified, the term "or" is inclusive in the present application. For instance, the phrase "A or B" expresses "A, B, or A and B". More specifically, any one of the following conditions satisfies "A or B", A is true (or exits) and B is false (or does not exist); A is false (or does not exist) but B is true (or exists); or A and B are true (or exist).

In one implementation of the present application, the present application provides a secondary battery, wherein the secondary battery includes an electrode assembly and an electrolytic solution configured to infiltrate the electrode assembly; the electrode assembly includes a negative electrode plate, a separation film and a positive electrode plate, and the negative electrode plate includes a negative electrode current collector and a negative electrode material layer located on at least one surface of the negative electrode current collector; and by setting a tortuosity of the negative electrode plate as τ, the τ satisfies Formula I below:

$$\tau = 0.5(\varepsilon)^{-\alpha} \quad \text{Formula I}$$

where, ε is a porosity of the negative electrode material layer, and α is a Bruggeman index of the negative electrode material layer, and the τ and a conductivity σ of the electrolytic solution satisfy Formula II below:

$$(2\tau)^{0.5} + 6 \leq \sigma \leq (2\tau)^{0.5} + 10 \quad \text{Formula II.}$$

Although the mechanism is not clear, the inventor of the present application, after handling numerous experimental data, unexpectedly finds that: by virtue of enabling the tortuosity τ of the negative electrode plate and the conductivity σ of the electrolytic solution to satisfy the foregoing relationship, the secondary battery can obtain an excellent fast-charging characteristic.

The inventor of the present application speculates that there are two factors to restrict the fast-charging ability of the secondary battery: 1) transmission dynamic performance of lithium ions in a negative electrode; and 2) liquid phase diffusion ability of the lithium ions in the electrolytic solution. If the performance of the negative electrode material and the electrolytic solution does not match, for example, when the liquid phase transmission of the lithium ions is fast but the dynamic performance of the negative electrode material is poor, the lithium ions migrated to a surface of the negative electrode cannot be diffused to the negative electrode in time, which will cause the lithium ions to be directly reduced to metal lithium on a surface of an anode, namely "lithium precipitation on the anode", resulting in security risks; if the dynamic performance of the negative electrode material is good but the liquid phase diffusion ability of the lithium ions in the electrolytic solution is poor, the lithium ions separated from the positive electrode cannot reach the negative electrode in time, reducing the charging capacity of the secondary battery. The good fast-charging performance can be obtained only when the dynamic performance of the negative electrode material matches that of the electrolytic solution.

Here, as shown in FIG. 1, the tortuosity τ of the electrode plate expresses a ratio of a migration path ΔL of the lithium ions in the electrode plate to a thickness Δx of the electrode plate. The tortuosity τ is closely related to the porosity ε of the electrode plate. The tortuosity τ of different negative electrode materials can be estimated by $0.5(\varepsilon)^{-\alpha}$.

The Bruggeman index α can be obtained by calculating an SEM photo of the negative electrode material layer by means of Wolfram Mathematica software. In the following paragraphs, a calculation method of the Bruggeman index α is depicted with reference to FIG. 2 and FIG. 3.

Figure 2:
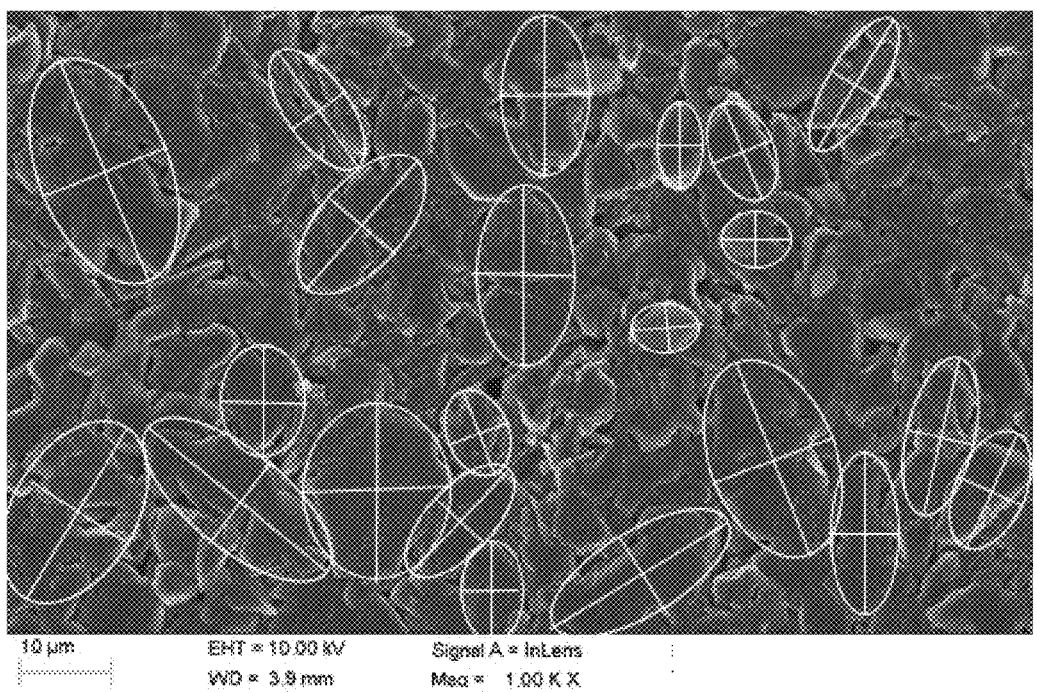
FIG. 2 is a top SEM photo of an example of a negative electrode material layer illustrating a calculation method of a tortuosity τ of an electrode plate.
Figure 3:
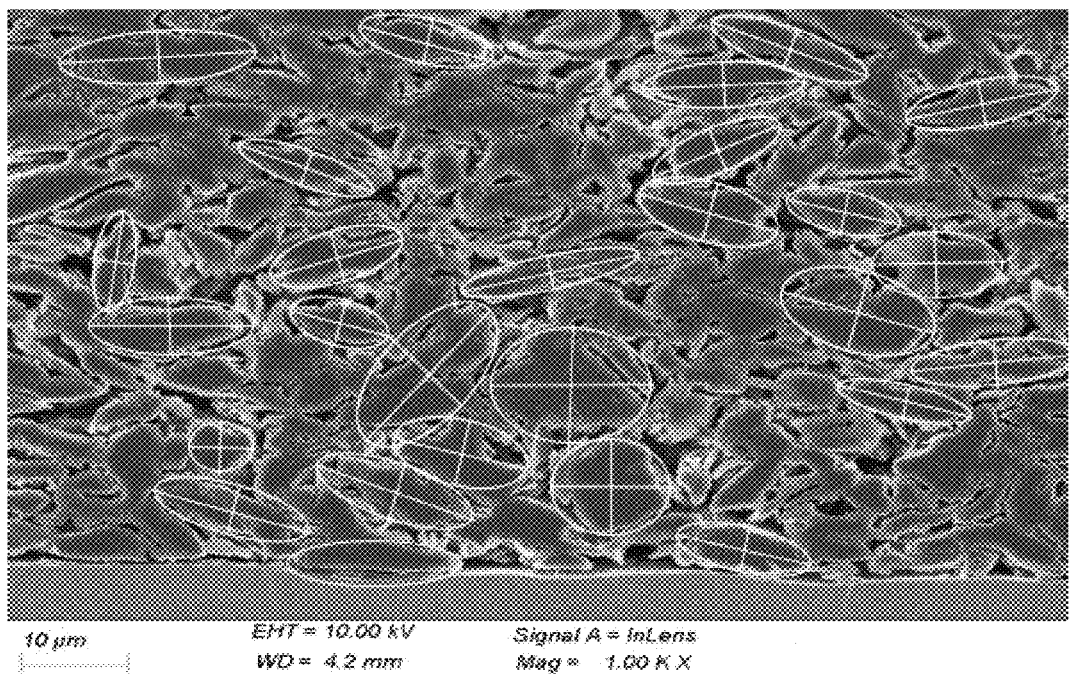
FIG. 3 is a sectional SEM photo of an example of a negative electrode material layer illustrating a calculation method of a tortuosity τ of an electrode plate.

First, top and sectional SEM photos of the negative electrode material layer are obtained from the manufactured negative electrode plate. FIG. 2 is an example of the top SEM photo of the negative electrode material layer. FIG. 3 is an example of the sectional SEM photo of the negative electrode material layer.

Second, the Wolfram Mathematica software is utilized to manually mark long and short axes of 50 to 90 activated particles and fit contours of all the activated particles in the top and sectional SEM photos of the negative electrode material layer.

Finally, the Wolfram Mathematica software is utilized to calculate a Bruggeman index $\alpha_x$, $\alpha_y$ in a plane direction of the negative electrode material layer and a Bruggeman index $\alpha_z$ in a normal direction (sectional direction) thereof according to the obtained top and sectional SEM photos of the negative electrode material layer with the contours of the activated particles marked. α in the foregoing formula $(\varepsilon)^{-\alpha}$ is the Bruggeman index $\alpha_z$ in the normal direction (sectional direction).

In addition, the porosity of the foregoing manufactured electrode plate is tested with reference to GB/T 24586-2009.

In some implementations, the tortuosity τ of the negative electrode plate and the conductivity σ of the electrolytic solution may further satisfy $(2\tau)^{0.5}+6 \leq \sigma \leq (2\tau)^{0.5}+8$. Thus, the better fast-charging performance can be obtained by further matching the dynamic performance of the negative electrode material with the dynamic performance of the electrolytic solution.

In some implementations, the τ satisfies: $2.3 \leq \tau \leq 7$. Making the tortuosity τ in the foregoing range improves the dynamic performance of the negative electrode material, and further improves the fast-charging characteristic of the secondary battery.

In some implementations, the σ ranges from 8 mS/cm to 14 mS/cm. Making the conductivity σ of the electrolytic solution in the foregoing range improves the dynamic performance of the electrolytic solution, and further improves the fast-charging characteristic of the secondary battery.

In some implementations, the porosity ε of the negative electrode material layer is 25% to 45%. Making the porosity of the negative electrode material layer in this range can improve the dynamic performance of the negative electrode material, and further improves the fast-charging characteristic of the secondary battery.

In some implementations, the negative electrode material of the negative electrode plate is graphite, and the α is 1.5-2.2. Therefore, the tortuosity of the negative electrode plate can be estimated more accurately. It should be noted that the negative electrode material is not limited to the graphite, and can be other common negative electrode materials. The Bruggeman index α is also applicable to the negative electrode materials in addition to the graphite.

In some implementations, the electrolytic solution includes at least one of cyclic ester, dimethyl carbonate, diethyl carbonate, ethyl methyl carbonate, ethyl acetate, methyl acetate, methyl formate, ethyl formate, methyl propionate, propyl formate, ethyl propionate and propyl acetate, and the cyclic ester includes at least one of ethylene carbonate and propylene carbonate. Therefore, the conductivity of the electrolytic solution can be adjusted easily.

In some implementations, a lithium salt of the electrolytic solution includes at least one of lithium hexafluorophosphate ($LiPF_6$) and lithium fluorosulfonyl imide, and has a concentration of 0.5-1.5 mol/L. Therefore, the conductivity of the electrolytic solution can be further improved and the lithium precipitation on the negative electrode can be restrained.

In some implementations, the lithium fluorosulfonyl imide includes lithium bis(fluorosulfonyl)imide, lithium fluoro(trifluoromethyl)sulfonylimide, lithium bis(trifluoromethyl)sulfonylimide, lithium bis(pentafluoroethyl)sulfonylimide and lithium fluoro(perfluorobutyl)sulfonylimide, preferably the lithium bis(fluorosulfonyl)imide. Therefore, the conductivity of the electrolytic solution can be further improved and the lithium precipitation on the negative electrode can be restrained.

In some implementations, a coating thickness of the negative electrode material layer is 30 μm to 400 μm in the negative electrode plate. Therefore, the coating amount of the negative electrode active material can be improved, and the energy density of the secondary battery can be further improved.

In addition, the secondary battery, the battery module, the battery pack and the electric device of the present application are depicted with reference to the accompanying drawings in the following paragraphs.

[Secondary Battery]

In one implementation of the present application, provided is a secondary battery.

Usually, the secondary battery includes a negative electrode plate, a positive electrode plate, an electrolyte and a separation film. In the charging and discharging process of the battery, active ions are intercalated and separate out back and forth between the positive electrode plate and the negative electrode plate. The electrolyte conducts the ions between the positive electrode plate and the negative electrode plate. The separation film is provided between the positive electrode plate and the negative electrode plate to mainly prevent the short-circuit of a positive electrode and a negative electrode, and allow the ions to pass through.

[Positive Electrode Plate]

The positive electrode plate includes a positive electrode current collector and a positive electrode film layer provided on at least one surface of the positive electrode current collector, and the positive electrode film layer includes a positive electrode active material according to the first aspect of the present application.

As an example, the positive electrode current collector has two surfaces which are opposite to each other in a thickness direction thereof, and the positive electrode film layer is provided on any one or two of the two opposite surfaces of the positive electrode current collector.

In some implementations, the positive electrode current collector may adopt metal foil or a composite current collector. For example, aluminum foil may be applied as the metal foil. The composite current collector may include a high polymer material substrate and a metal layer formed on at least one surface of the high polymer material substrate. The composite current collector can be formed by virtue of forming metal materials (aluminum, aluminum alloy, nickel, nickel alloy, titanium, titanium alloy, silver and silver alloy, etc.) on the high polymer material substrate (such as polypropylene (PP), polyethylene terephthalate (PET), polybutylene terephthalate (PBT), polystyrene (PS) and polyethylene (PE)).

In some implementations, the positive electrode active material may be a positive electrode active material for batteries known in the art. As an example, the positive electrode active material may include at least one of olivine-type Li-contained phosphate, lithium transition metal oxide and respective modified compounds thereof. Nevertheless, the present application is not limited to these materials, and may use other traditional materials that may be used as positive electrode active materials of the battery. Only one or a combination of more than two of positive electrode active materials may be used. An example of the lithium transition metal oxide may include, but is not limited to, at least one of lithium cobalt oxides (such as LiCoO2), lithium nickel oxides (such as LiNiO2), lithium manganese oxides (such as LiMnO2 and LiMn2O4), lithium nickel cobalt oxides, lithium manganese cobalt oxides, lithium manganese nickel oxides, lithium nickel cobalt manganese oxides (such as LiNi1/3Co1/3Mn1/3O2 (also NCM333 for short), LiNi0.5Co0.2Mn0.3O2 (also NCM523 for short), LiNi0.5Co0.25Mn0.25O2 (also NCM211 for short), LiNi0.6Co0.2Mn0.2O2 (also NCM622 for short), LiNi0.8Co0.1Mn0.1O2 (also NCM811 for short), lithium nickel cobalt aluminum oxides (such as LiNi0.85Co0.15Al0.05O2)) and modified compounds thereof. An example of the olivine-type Li-contained phosphate may include, but is not limited to, at least one of lithium iron phosphate (such as LiFePO4 (LFP for short)), a composite of lithium iron phosphate and carbon, lithium manganese phosphate (such as LiMnPO4), a composite of lithium manganese phosphate and carbon, lithium ferromanganese phosphate, and a composite material of lithium ferromanganese phosphate and carbon.

In some implementations, the positive electrode film layer may optionally include a binding agent. As an example, the binding agent may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluorine-containing acrylate resin.

In some implementations, the positive electrode film layer may optionally include a conductive agent. As an example, the conductive agent may include at least one of superconducting carbon, acetylene black, carbon black, Ketjen black, carbon dot, carbon nanotube, graphene and carbon nanofiber.

In some implementations, the positive electrode plate may be prepared by the following steps: dispersing components for preparing the positive electrode plate, such as the positive electrode active material, the conductive agent, the binding agent and any other components into a solvent (such as N-methylpyrrolidone (NMP)) to form a positive electrode paste; and coating the positive electrode paste to the positive electrode current collector, and finally obtaining the positive electrode plate after drying, cold pressing, etc.

[Negative Electrode Plate]

The negative electrode plate includes a negative electrode current collector and a negative electrode film layer provided on at least one surface of the negative electrode current collector, and the negative electrode film layer includes a negative electrode active material.

As an example, the negative electrode current collector has two surfaces which are opposite to each other in a thickness direction thereof, and the negative electrode film layer is provided on any one or two of the two opposite surfaces of the negative electrode current collector.

In some implementations, the negative electrode current collector may adopt metal foil or a composite current collector. For example, copper foil can be applied as the metal foil. The composite current collector may include a high polymer material substrate and a metal layer formed on at least one surface of the high polymer material substrate. The composite current collector can be formed by virtue of forming metal materials (copper, copper alloy, nickel, nickel alloy, titanium, titanium alloy, silver and silver alloy, etc.) on the high polymer material substrate (such as polypropylene (PP), polyethylene terephthalate (PET), polybutylene terephthalate (PBT), polystyrene (PS) and polyethylene (PE)).

In some implementations, the negative electrode active material may be a negative electrode active material for batteries known in the art. As an example, the negative electrode active material may include at least one of synthetic graphite, natural graphite, soft charcoal, hard charcoal, Si-based material, Sn-based material, lithium titanate, and the like. The Si-based material may be selected from at least one of monatomic silicon, silicon oxide compound, silicon carbon complex, silicon-nitrogen complex and silicon alloy. The Sn-based material may be selected from at least one of monatomic tin, tin oxide compound and tin alloy. Nevertheless, the present application is not limited to these materials, and can use other traditional materials that may be used as negative electrode active materials of the battery. Only one or a combination of more than two of the negative electrode active materials may be used.

In some implementations, the negative electrode film layer may optionally include a binding agent. The binding agent may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some implementations, the negative electrode film layer may further optionally include a conductive agent. The conductive agent may be selected from at least one of superconducting carbon, acetylene black, carbon black, Ketjen black, carbon dot, carbon nanotube, graphene and carbon nanofiber.

In some implementations, the negative electrode film layer may further optionally include other adjuvants, such as a thickening agent (for example, sodium carboxymethylcellulose (CMC-Na)).

In some implementations, the negative electrode plate may be prepared by the following steps: dispersing components for preparing the negative electrode plate, such as the negative electrode active material, the conductive agent, the binding agent and any other components into a solvent (such as deionized water) to form a negative electrode paste; and coating the negative electrode paste to the negative electrode current collector, and finally obtaining the negative electrode plate after drying, cold pressing, etc.

[Separation Film]

As the foregoing separation film, the present application does not have special limits, and any known porous separation film with electrochemical stability and mechanical stability, for example, a monolayer thin film or multilayer thin film containing at least one or more of glass fiber, non-woven fabric, polyethylene, polypropylene, and polyvinylidene fluoride, may be selected according to actual requirements.

[Electrolytic Solution]

The electrolyte conducts the ions between the positive electrode plate and the negative electrode plate. The present application has no specific restriction on the types of the electrolyte, which may be selected according to the requirements. For example, the electrolyte may be liquid-state, gel-state or all-solid-state.

In some implementations, the electrolyte adopts an electrolytic solution. The electrolytic solution includes an electrolyte salt, a solvent and an additive.

In some implementations, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulphonyl)imide, lithium trifluoromethanesulfonate, lithium difluorophosphate, lithium difluoro(oxalato)borate, lithium bis(oxalate)borate, lithium difluorodioxalate phosphate and lithium bis(oxyalyl)difluorophosphate.

In some implementations, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, ethyl fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, cyclobutyl sulfone, dimethyl sulfone, methyl ethyl sulfone and diethyl sulfone.

In some implementations, the electrolytic solution includes the additive, the additive includes fluoroethylene carbonate and/or vinylene carbonate. Besides, the electrolytic solution may further include other additives such as a negative electrode film-forming additive and a positive electrode film-forming additive, and may further include additives that can improve certain properties of the battery, for example, an additive for improving an overcharging performance of the battery and an additive for improving a high-temperature or low-temperature property of the battery.

In some implementations, the positive electrode plate, the negative electrode plate and the separation film may be prepared into an electrode assembly by virtue of a winding process or a laminating process.

In some implementations, the secondary battery may include an outer package. The outer package may be configured to package the foregoing electrode assembly and the electrolyte.

In some implementations, the outer package of the secondary battery may be a hard shell, such as a hard plastic shell, aluminum shell and steel shell. The outer package of the secondary battery may be a flexible package, such as a bag-type flexible package. The flexible package may be made of plastic, such as polypropylene, polybutylene terephthalate and polybutylene succinate.

Figure 4:
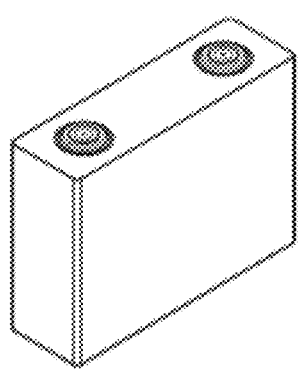
FIG. 4 is a schematic diagram of a secondary battery according to an implementation of the present application.

Without any special restriction on the shape of the secondary battery according to the present application, the secondary battery may be a cylinder, a square and any other shapes. For example, FIG. 4 shows a secondary battery 5 of a square structure as an example.

Figure 5:
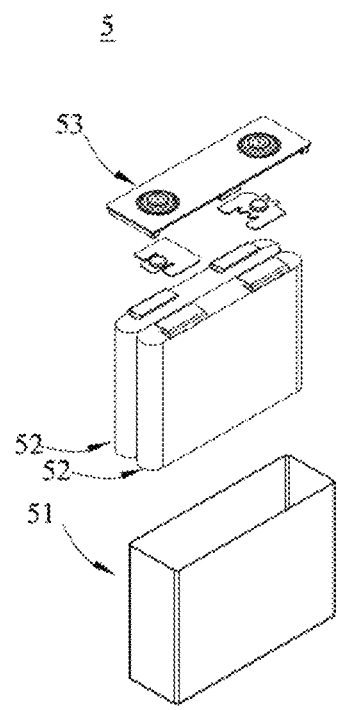
FIG. 5 is an exploded view of a secondary battery according to an implementation of the present application as shown in FIG. 4.

In some implementations, referring to FIG. 5, the outer package may include a housing 51 and a cover plate 53. The housing 51 may include a baseplate and side plates connected to the baseplate. The baseplate and the side plates are enclosed into an accommodating cavity. The housing 51 has an opening in communication with the accommodating cavity, and the cover plate 53 can cover the opening to close the accommodating cavity. The positive electrode plate, the negative electrode plate and the separation film may be wound or laminated into the electrode assembly 52. The electrode assembly 52 is packaged into the accommodating cavity. The electrolytic solution is infiltrated into the electrode assembly 52. The secondary battery 5 may include one or more electrode assemblies 52, which may be selected by those skilled in the art according to actual requirements.

Battery Module

In some implementations, the secondary battery may be assembled into a battery module, the battery module includes one or more secondary batteries, and the specific number may be selected by those skilled in the art according to the applications and capacities of the battery module.

Figure 6:
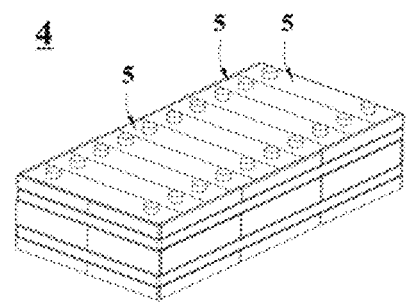
FIG. 6 is a schematic diagram of a battery module according to an implementation of the present application.

FIG. 6 is a battery module 4 as an example. Referring to FIG. 6, in the battery module 4, a plurality of secondary batteries 5 may be arranged sequentially in a length direction of the battery module 4. Certainly, the secondary batteries may be arranged in any other manners. Further, the plurality of secondary batteries 5 may be fixed by fasteners.

Optionally, the battery module 4 may further include a shell having an accommodating space in which the plurality of secondary batteries 5 are accommodated.

Battery Pack

In some implementations, the above-mentioned battery module may be assembled into a battery pack, the battery pack includes one or more battery modules, and the specific number may be selected by those skilled in the art according to the applications and capacities of the battery pack.

Figure 7:
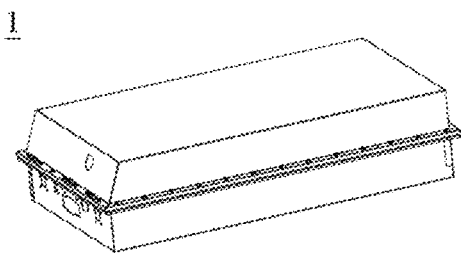
FIG. 7 is a schematic diagram of a battery pack according to an implementation of the present application.
Figure 8:
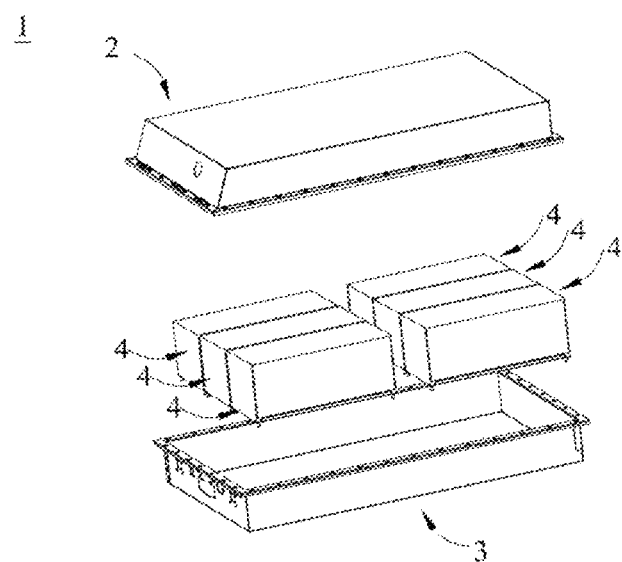
FIG. 8 is an exploded view of a battery pack according to an implementation of the present application as shown in FIG. 7.

FIG. 7 and FIG. 8 show a battery pack 1 as an example. Referring to FIG. 7 and FIG. 8, the battery pack 1 may include a battery box and the plurality of battery modules 4 disposed in the battery box. The battery box includes an upper box body 2 and a lower box body 3, and the upper box body 2 can cover the lower box body 3 to form an enclosed space for accommodating the battery modules 4. The plurality of battery modules 4 may be arranged in the battery box in any manner.

Electric Device

In addition, the present application further provides an electric device, the electric device includes at least one of the secondary battery, the battery module or the battery pack according to the present application. The secondary battery, the battery module or the battery pack may be used as a power supply of the electric device or an energy storage unit of the electric device. The electric device may include, but is not limited to, a mobile device (e.g., a mobile phone and a notebook computer), an electric vehicle (e.g., a full electric vehicle, a hybrid electric vehicle, a plug-in hybrid electric vehicle, an electric bicycle, an electric scooter, an electric golf vehicle, and an electric truck), an electric train, a ship, a satellite, and an energy storage system.

As the electric device, the secondary battery, the battery module or the battery pack may be selected according to the using requirements of the electric device.

Figure 9:
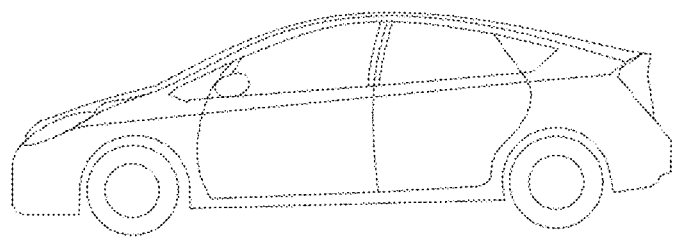
FIG. 9 is a schematic diagram of an electric device with a secondary battery as a power supply according to an implementation of the present application.

FIG. 9 is an electric device as an example. The electric device serves as a full electric vehicle, a hybrid electric vehicle, a plug-in hybrid electric vehicle and the like. In order to satisfy the requirements of the electric device for a high power and a high energy density of the secondary battery, the battery pack or the battery module may be adopted.

As another example, the device may be a mobile phone, a tablet PC, a notebook computer, or the like. The device is usually required to be thin and light, and may adopt the secondary battery as the power supply.

EMBODIMENTS

The following illustrates the embodiments of the present application. The embodiments depicted below are exemplary and are intended to be illustrative of the present application and is not to be construed as limiting thereof. Without specific technologies or conditions indicated in the embodiments, follow the technologies or conditions depicted in the documents in the art or the product manuals. Reagents or instruments used without indication of manufacturers may be general products purchased from the markets.

Embodiment 1

①  Preparation Method
(1) Preparation of an Electrolytic Solution

In a glove box filled with argon (water content<10 ppm and oxygen content<1 ppm), the total mass is set to be 100 parts, a non-aqueous organic solvent including 25.5 parts of ethylene carbonate and 59.5 parts of ethyl methyl carbonate are uniformly mixed, 15 parts of lithium hexafluorophosphate ($LiPF_6$) are slowly added into the non-aqueous organic solvent, and a target electrolytic solution, i.e. the electrolytic solution, is obtained after lithium salts are dissolved completely. A room temperature conductivity of the target electrolytic solution is tested.

The room temperature conductivity of the electrolytic solution is tested with reference to HG-T 4067-2015.

(2) Preparation of a Positive Electrode Plate

A positive electrode active material $LiNi_{0.5}Co_{0.2}Mn_{0.3}O_2$, a conductive agent Super P, and a binding agent polyvinylidene fluoride (PVDF) are added into N-methylpyrrolidone (NMP) to be prepared into a positive electrode paste. A solid content in the positive electrode paste is 50 wt %, and a mass ratio of the $LiNi_{0.5}Co_{0.2}Mn_{0.3}O_2$ to the Super P to the PVDF in a solid ingredient is 95:2:3. The positive electrode paste is coated on aluminum foil of a current collector, cold pressing is performed after drying at 85° C., and then drying is performed for 4 h at 85° C. to obtain the positive electrode plate after trimming, cutting into pieces and cutting into stripes.

(3) Preparation of Negative Electrode Material-Graphite A

Graphite having a mean particle diameter Dv50 of 15 μm is prepared as a negative electrode material. A Bruggeman Index α of the graphite is 1.9. Those skilled in the art may control the Bruggeman index α of the graphite by adjusting the mean particle diameter of the graphite.

It should be noted that those skilled in the art may obtain graphite B and graphite C by adjusting the particle diameter of the graphite in the same way.

(4) Preparation of a Negative Electrode Plate

The above-mentioned graphite as the negative electrode active material, a conductive agent Super P, a thickening agent CMC, and a binding agent styrene butadiene rubber (SBR) are uniformly mixed in deionized water to obtain a negative electrode paste. A solid content in the negative electrode paste is 30 wt %, and a mass ratio of the graphite to the Super P to the CMC to the binding agent styrene butadiene rubber (SBR) in a solid ingredient is 94:3:3. The negative electrode paste is coated on copper foil of a current collector, drying is performed at 85° C., and then drying is performed for 12 h at 120° C. in vacuum to obtain the negative electrode plate after cold pressing, trimming, cutting into pieces and cutting into stripes. Here, the pressure of a cold pressing roll is 38 T during cold pressing, and the electrode plate having a compaction density of 1.24 g/cm³ and a porosity of 45% is obtained.

It should be noted that the porosities of different negative electrode material (graphite) layers may be adjusted by controlling the pressure of the cold roll to control the compaction density of the electrode plate.

(5) Preparation of a Lithium Ion Battery

A 16 μm polyethylene film (PE) is taken as a separation film. The positive electrode plate, the separation film and the negative electrode plate which are prepared are laminated in sequence, the separation film is made to be located between the positive electrode plate and the negative electrode plate to separate a positive electrode from a negative electrode, the above-mentioned parts are wound to obtain a bare battery core, tabs are welded, the bare battery core is put in an outer package, the above-mentioned prepared electrolytic solution is injected into the dry battery core, and a lithium ion battery (a flexibly packaged lithium ion battery has a thickness of 4.0 mm, a width of 60 mm, and a length of 140 mm) is prepared after packaging, standing, formation, shaping, capacity test and the like.

② Performance Evaluation (i) Room Temperature Conductivity of the Electrolytic Solution The conductivity of the electrolytic solution obtained in the foregoing (1) is tested, and a room temperature conductivity of the electrolytic solution is tested with reference to HG-T 4067-2015.

(ii) Test on Porosity of Electrode Plate

A porosity of the electrode plate obtained in the foregoing (4) is tested, and a testing method of the porosity of the electrode plate is performed with reference to GB/T 24586-2009.

(iii) Test on Fast-Charging Performance

The lithium ion battery obtained in the foregoing (5) is charged at a 1 C constant current to 4.25 V at 25° C., then charged at a 4.25V constant voltage until the current is 0.05 C, and then discharged to 2.8 V at the 1 C constant current, a discharge capacity D0 of the battery is recorded, then the battery is charged to 4.25 V at a 4 C constant current, charged at a 4.25V constant voltage till the current is 0.05 C, then discharged to 2.8 V at the 1 C constant current, a discharge capacity D1 is recorded, and a discharge capacity retention ratio as D1/D0.

(iv) Lithium Precipitation on the Negative Electrode

The formed battery is charged to 4.25 V at a 2 C constant current at 25° C., charged at a 4.25V constant voltage till the current is less than 0.05 C, then discharged at the 1 C current to 2.8 V; after circulating for 10 circles, charged at a 2 C constant current to 4.25 V, and charged at a 4.25V constant voltage till the current is less than 0.05 C, and the fully charged battery is obtained.

The battery circulated for 10 circles is broken down, and lithium precipitation on the negative electrode is observed.

Upon observation, the evaluation benchmark is as follows.

No lithium precipitation: an inner ring area is fully charged, a surface of the negative electrode is in gold yellow, and no gray metal lithium powder is found on a dust-free paper after the surface of the negative electrode is wiped by the dust-free paper.

Slight lithium precipitation: the inner ring area is fully charged, the surface of the negative electrode is in dull yellow, and gray metal lithium powder is found on the dust-free paper after the surface of the negative electrode is wiped by the dust-free paper.

Gray spots: the inner ring area is fully charged, and the surface of the negative electrode is in gray partially, without gold yellow through.

Severe lithium precipitation: the inner ring area is fully charged, and the surface of the negative electrode is in gray fully, without gold yellow through.

In the present application, a preferred sequence of lithium precipitation on the negative electrode is: no lithium precipitation>gray spots>slight lithium precipitation>severe lithium precipitation.

Embodiment 2 to Embodiment 8, Comparative Example 1 to Comparative Example 2

In the Embodiments 2 to 8 and Comparative Examples 1 to 2, the secondary batteries are obtained by virtue of the same preparation method as Embodiment 1, in addition to changing the types and contents of raw materials of the electrolytic solution as shown in Table 1 as well as changing the particle diameter of the negative electrode material, the compaction density of the negative electrode plate and other parameters as shown in Table 2.

TABLE 1

| No. | Solvent (g) | | | | Lithium salt (g) | | Test item Conductivity of electrolytic solution at 25° C. (mS/cm) |
| | Ethylene carbonate | Dimethyl carbonate | Ethyl acetate | Ethyl Methyl Carbonate | LiPF6 | LiFSI | |
| --- | --- | --- | --- | --- | --- | --- | --- |
| Electrolytic solution 1 | 25.5 | — | — | 59.5 | 15 | — | 8.5 |
| Electrolytic solution 2 | 28.125 | 65.625 | — | — | 6.25 | — | 9 |
| Electrolytic solution 3 | 26.25 | 17.5 | — | 43.75 | 12.5 | — | 9.6 |
| Electrolytic solution 4 | 26.25 | 26.25 | — | 35 | 12.5 | — | 10 |
| Electrolytic solution 5 | 25.815 | 51.63 | 8.605 | — | 6.25 | 7.7 | 12 |
| Electrolytic solution 6 | 25.38 | 54.99 | 4.23 | — | — | 15.4 | 13 |

TABLE 2

| Battery No. | Negative electrode material | Mean particle diameter Dv50 of negative electrode material (μm) | Bruggeman Index α of negative electrode material | Compaction density of negative electrode plate (g/cm³) | Porosity ε of negative electrode material layer | Tortuosity τ of negative electrode plate |
| --- | --- | --- | --- | --- | --- | --- |
| Embodiment 1 | Graphite A | 15 | 1.9 | 1.24 | 45% | 2.3 |
| Embodiment 2 | Graphite A | 15 | 1.9 | 1.38 | 39% | 3.0 |
| Embodiment 3 | Graphite A | 15 | 1.9 | 1.51 | 33% | 4.1 |
| Embodiment 4 | Graphite A | 15 | 1.9 | 1.58 | 30% | 4.9 |
| Embodiment 5 | Graphite A | 15 | 1.9 | 1.70 | 25% | 7.0 |
| Embodiment 6 | Graphite A | 15 | 1.9 | 1.51 | 33% | 4.1 |
| Embodiment 7 | Graphite B | 20 | 1.5 | 1.51 | 33% | 2.6 |
| Embodiment 8 | Graphite C | 8 | 2.2 | 1.51 | 33% | 5.7 |
| Comparative Example 1 | Graphite A | 20 | 1.9 | 1.51 | 33% | 4.1 |
| Comparative Example 2 | Graphite A | 20 | 1.9 | 1.51 | 33% | 4.1 |

| Battery No. | Type of electrolytic solutions | Conductivity of electrolytic solution | $(2\tau)^{0.5} + 6 \leq \sigma \leq (2\tau)^{0.5} + 10$ | $((2\tau)^{0.5} + 6 \leq \sigma \leq (2\tau)^{0.5} + 10)$ | Whether to meet Capacity retention ratio | Whether to cause lithium precipitation |
| --- | --- | --- | --- | --- | --- | --- |
| Embodiment 1 | Electrolytic solution 1 | 8.5 | 8.1 ≤ σ ≤ 12.1 | Yes | 90.30% | No |
| Embodiment 2 | Electrolytic solution 2 | 9 | 8.4 ≤ σ ≤ 12.4 | Yes | 90.50% | No |
| Embodiment 3 | Electrolytic solution 3 | 9.6 | 8.8 ≤ σ ≤ 12.8 | Yes | 90.40% | No |
| Embodiment 4 | Electrolytic solution 3 | 9.6 | 9.1 ≤ σ ≤ 13.1 | Yes | 90.80% | No |
| Embodiment 5 | Electrolytic solution 4 | 10 | 9.7 ≤ σ ≤ 13.7 | Yes | 91.40% | No |
| Embodiment 6 | Electrolytic solution 5 | 12.0 | 8.8 ≤ σ ≤ 12.8 | Yes | 89.70% | Slight |

TABLE 2-continued

| | | | | | |
|---|---|---|---|---|---|
| Embodiment 7 | Electrolytic solution 3 | 9.6 | 8.3 ≤ σ ≤ 12.3 | Yes | 90.70% | No |
| Embodiment 8 | Electrolytic solution 4 | 10.0 | 9.4 ≤ σ ≤ 13.4 | Yes | 91.20% | No |
| Comparative Example 1 | Electrolytic solution 1 | 8.5 | 8.8 ≤ σ ≤ 12.8 | No | 73.20% | Severe |
| Comparative Example 2 | Electrolytic solution 6 | 13 | 8.8 ≤ σ ≤ 12.8 | No | 70.40% | Gray spots |

As can be seen from the test results of Table 2, by comparing the Embodiments 1 to 8 with the Comparative Examples 1 and 2, all of which satisfy $(2\tau)^{0.5}+6\leq\sigma\leq(2\tau)^{0.5}+10$, the fast-charging performance of different negative electrode materials are significantly improved, and the lithium precipitation on the negative electrode is also obviously improved. As can be seen, the good fast-charging performance can be obtained and the lithium precipitation on the negative electrode can be avoided when the dynamic performance of the negative electrode matches the dynamic performance of the electrolytic solution. In Comparative Example 1, the conductivity of the electrolytic solution is excessively low and lithium ions migrate slowly in a liquid phase, the lithium ions separated from the positive electrode cannot be intercalated into the negative electrode in time, instead gathered on the positive electrode, which causes a positive electrode potential to raise quickly, thereby reaching a stopping potential. Hence, the discharge capacity retention ratio is relatively low. Besides, electrons in an outer circuit are transferred to the negative electrode, the negative electrode potential drops, and the lithium ions may reach a lithium precipitation potential when migrating to the negative electrode, so the lithium precipitation occurs. In Comparative Example 2, when the conductivity of the electrolytic solution is excessively high, during charging, the lithium ions separated from the positive electrode reach the negative electrode rapidly. But due to poor dynamics of the negative electrode, the lithium ions gathered on a negative electrode boundary cannot be quickly intercalated into the negative electrode. With the drop of the negative electrode potential, the lithium ions on the boundary are reduced into metal lithium, becoming "dead lithium". Therefore, the fast-charging performance is relatively poor.

In addition, as can be seen from the comparison of Embodiments 1 to 5 with Embodiment 6, Embodiments 1 to 5 that satisfy $(2)^{0.5}+6\leq\sigma\leq(2\tau)^{0.5}+8$ can obtain the more excellent fast-charging performance and further restrain the lithium precipitation on the negative electrode.

It should be noted that the present application is not limited to the foregoing implementations. The foregoing implementations are merely examples. The implementations having the substantially same composition as the technical idea and the same effect in the scope of the technical solution of the present application are included in the technical scope of the present application. In addition, without departing from the substance scope of the present application, various modifications that those skilled in the art can appreciate are applied to the implementations, and other methods for combining some composition elements in the implementations are also included in the scope of the present application.

What is claimed is:

1. A secondary battery, comprising
an electrode assembly and an electrolytic solution configured to infiltrate the electrode assembly, wherein
the electrode assembly comprises a negative electrode plate, a separation film and a positive electrode plate, and the negative electrode plate includes a negative electrode current collector and a negative electrode material layer located on at least one surface of the negative electrode current collector;
by setting a tortuosity of the negative electrode plate as τ, the τ satisfies Formula I below:

$\tau=0.5(\varepsilon)^{-\alpha}$  Formula I where, ε is a porosity of the negative electrode material layer, and α is a Bruggeman index of the negative electrode material layer,
the τ and a conductivity σ of the electrolytic solution satisfy Formula II below:

$6\leq\sigma-(2\tau)^{0.5}\leq10$  Formula II, the τ satisfies: 4.9≤τ≤7, and
the σ ranges from 8 mS/cm to 14 mS/cm.
2. The secondary battery according to claim 1, wherein the porosity ε of the negative electrode material layer is 25% to 45%.
3. The secondary battery according to claim 1, wherein a negative electrode material is graphite, and the α is 1.5 to 2.2.
4. The secondary battery according to claim 1, wherein the electrolytic solution includes at least one of cyclic esters including ethylene carbonate and propylene carbonate, as well as at least one of dimethyl carbonate, diethyl carbonate, ethyl methyl carbonate, ethyl acetate, methyl acetate, methyl formate, ethyl formate, methyl propionate, propyl formate, ethyl propionate and propyl acetate.
5. The secondary battery according to claim 1, wherein a lithium salt of the electrolytic solution includes at least one of lithium hexafluorophosphate and lithium fluorosulfonyl imide, and has a concentration of 0.5-1.5 mol/L.
6. The secondary battery according to claim 5, wherein the lithium fluorosulfonyl imide includes at least one of lithium bis(fluorosulfonyl)imide, lithium fluoro (trifluoromethyl) sulfonylimide, lithium bis(trifluoromethyl) sulfonylimide, lithium bis(pentafluoroethyl) sulfonylimide and lithium fluoro (perfluorobutyl) sulfonylimide, preferably the lithium bis(fluorosulfonyl)imide.
7. The secondary battery according to claim 1, wherein a thickness of the negative electrode material layer is 30 μm-400 μm in the negative electrode plate.
8. A battery module, comprising
the secondary battery according to claim 1.
9. A battery pack, comprising
the battery module according to claim 8.
10. An electric device, comprising
the battery pack according to claim 9.

* * * * *